US007800706B2

(12) United States Patent  
Kim et al.

(10) Patent No.: US 7,800,706 B2
(45) Date of Patent: Sep. 21, 2010

(54) COOLING FAN UNIT AND DISPLAY APPARATUS HAVING THE SAME

(75) Inventors: Sun-jin Kim, Suwon-si (KR); Seung-hoon Oh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 337 days.

(21) Appl. No.: 11/778,138

(22) Filed: Jul. 16, 2007

(65) Prior Publication Data

US 2008/0089028 A1    Apr. 17, 2008

(30) Foreign Application Priority Data

Oct. 16, 2006    (KR) .................. 10-2006-0100537

(51) Int. Cl.
G02F 1/1333 (2006.01)
(52) U.S. Cl. ........................................ 349/58
(58) Field of Classification Search ............... None
See application file for complete search history.

(56) References Cited

U.S. PATENT DOCUMENTS

| 5,991,153 A * | 11/1999 | Heady et al. ............. 361/704 |
| 6,104,451 A * | 8/2000 | Matsuoka et al. ............. 349/58 |
| 6,476,883 B1 * | 11/2002 | Salimes et al. ............. 349/58 |
| 6,522,543 B2 * | 2/2003 | Kurihara et al. ............. 361/704 |
| 7,259,964 B2 * | 8/2007 | Yamamura et al. ............. 361/697 |
| 2003/0128503 A1 * | 7/2003 | Takahashi ............. 361/681 |
| 2006/0070280 A1 | 4/2006 | Yamamura et al. |
| 2006/0104023 A1 | 5/2006 | Lee et al. |

FOREIGN PATENT DOCUMENTS

| CN | 1780548 A | 5/2006 |
| JP | 9-270975 A | 10/1997 |
| JP | 2004-029388 A | 1/2004 |
| KR | 2003-071073 A | 9/2003 |
| KR | 2006-026748 A | 3/2006 |

OTHER PUBLICATIONS

Office Action dated Jun. 11, 2010 issued by State Intellectual Property Office of PR China in Chinese Patent Application No. 200710146279.4.

* cited by examiner

Primary Examiner—Sung H Pak
(74) Attorney, Agent, or Firm—Sughrue Mion, PLLC

(57) ABSTRACT

A display apparatus having a casing in which an opening part is formed, includes: a liquid crystal display panel that is supported by the casing so that an image can be displayed through an opening part; a backlight unit that is provided behind the liquid crystal display panel and has a light source that emits light; a shield cover that is provided behind the backlight unit and is supported by at least one of the backlight unit and the casing; and a cooling fan unit that is combined to the shield cover and supplies cooling air to the backlight unit.

11 Claims, 6 Drawing Sheets

COOLING FAN UNIT AND DISPLAY APPARATUS HAVING THE SAME

CROSS-REFERENCE TO RELATED APPLICATIONS

This application claims priority from Korean Patent Application No. 10-2006-0100537, filed on Oct. 16, 2006 in the Korean Intellectual Property Office, the disclosure of which is incorporated herein by reference in its entirety.

BACKGROUND OF INVENTION

1. Field of Invention

Apparatuses consistent with the present invention relate to a cooling fan unit and a display apparatus having the same and, more particularly, to a cooling fan unit with improved assembly structure and a display apparatus having the same.

2. Description of the Related Art

Generally, a TV or a computer monitor is collectively called a display apparatus, which includes a liquid crystal display panel which forms a screen, a backlight unit located behind the liquid crystal display panel, a display main body having a casing which supports the liquid crystal display panel, and a stand which supports the display main body.

The liquid crystal display panel generally forms a screen using a liquid crystal display (LCD), a plasma display panel (PDP), or the like.

The backlight unit, which is located behind the liquid crystal display panel, irradiates light to the liquid crystal display panel. In recent years, the backlight unit using light emitting diodes (LEDs) as a light source has been under development.

However, in such a related art backlight unit, if heat generated from the LEDs is not emitted fast, the ambient temperature increases to thereby affect peripheral systems.

Accordingly, there may be a need to emit the heat generated from the LEDs efficiently. It is desirable to reduce any noises and vibrations that may be transferred to other parts, the noises and vibrations arising from a cooling fan which is a means to dissipate heat efficiently.

SUMMARY OF THE INVENTION

Accordingly, it is an aspect of the present invention to provide a cooling fan unit with improved cooling efficiency by efficiently cooling heat generated from a backlight unit, and a display apparatus having the same.

It is another aspect of the present invention to provide a cooling fan unit which can reduce the noise and vibration generated from a cooling fan to be delivered to other parts.

Additional aspects of the present invention will be set forth in part in the description which follows and, in part, will be apparent from the description, or may be learned by practice of the present invention.

The foregoing and/or other aspects of the present invention can be achieved by providing a display apparatus having a casing in which an opening part is formed, comprising: a liquid crystal display panel that is supported by the casing so that an image can be displayed through an opening part; a backlight unit that is provided behind the liquid crystal display panel and has a light source that emits light; a shield cover that is provided behind the backlight unit and is supported by at least one of the backlight unit and the casing; and a cooling fan unit that is combined with the shield cover and supplies cooling air to the backlight unit.

According to an exemplary embodiment of the present invention, the light source comprises light emitting diodes (LEDs).

According to an exemplary embodiment of the present invention, the shield cover is provided with a fan support that supports the cooling fan unit, the fan support being distanced from the casing and being formed at a position adjacent to the backlight unit.

According to an exemplary embodiment of the present invention, the fan support is formed at a central lower portion of the shield cover.

According to an exemplary embodiment of the present invention, the casing and the shield cover are provided with a plurality of air slits through which air generated by the cooling fan unit comes in and out.

According to an exemplary embodiment of the present invention, the cooling fan unit comprises a cooling fan and a fan cover that has one side provided with a first combining part combined with the cooling fan and the other side provided with a second combining part combined with the shield cover.

According to an exemplary embodiment of the present invention, the first combining part comprises: a first support that supports the cooling fan and the fan cover; and a first joining member that joins the cooling fan with the fan cover.

According to an exemplary embodiment of the present invention, the first combining part further comprises a first vibration absorption member that is disposed between a plurality of the first supports and absorbs vibration generated from the cooling fan.

According to an exemplary embodiment of the present invention, the second combining part comprises: a second support that supports the fan cover and the shield cover mutually; and a second joining member that joins the fan cover with the shield cover.

According to an exemplary embodiment of the present invention, the second combining part further comprises a second vibration absorption member that is disposed between a plurality of second supports and absorbs vibration generated from the cooling fan.

According to an exemplary embodiment of the present invention, each of the first support and the second support is provided plural in number.

According to an exemplary embodiment of the present invention, each of the first joining member and the second joining member comprises a screw.

The foregoing and/or other aspects of the present invention can be achieved by providing a display apparatus comprising: a front casing in which an opening part is formed; a liquid crystal display panel that is supported by the front casing so that an image can be displayed through the opening part; a backlight unit that is provided behind the liquid crystal display panel and has a light source that emits light, the light source comprising light emitting diodes (LEDs); a circuit board that is combined to the backlight unit and processes an inputted video signal; a power supply that supplies power to the liquid crystal display panel, the backlight unit and the circuit board; a shield cover that is provided behind the backlight unit and the circuit board and covers the backlight unit and the circuit board; a cooling fan unit that is combined with the shield cover and supplies cooling air to the backlight unit; and a rear casing that is combined with the front casing to form an external appearance of a rear region of the display apparatus.

According to an exemplary embodiment of the present invention, the display apparatus further comprises a controller that detects a rotation speed of the cooling fan unit and controls the backlight unit to lower luminance of an image displayed on the liquid crystal display panel when the rotation speed decreases below a predetermined reference speed.

According to an exemplary embodiment of the present invention, the shield cover is provided with a fan support that supports the cooling fan unit, the fan support being distanced from the rear casing and being formed at a central lower portion adjacent to the backlight unit and the circuit board.

According to an exemplary embodiment of the present invention, the shield cover and the rear casing are provided with a plurality of air slits through which the air generated by the cooling fan unit comes in and out.

According to an exemplary embodiment of the present invention, the cooling fan unit comprises a cooling fan that generates cooling air, and a fan cover that has one side combined with the cooling fan and the other side combined with the fan support, and wherein a vibration absorption member that absorbs vibration generated from the cooling fan is disposed between the cooling fan and the fan cover and/or between the fan cover and the fan support.

The foregoing and/or other aspects of the present invention can be achieved by providing a cooling fan unit that cools a backlight unit of a display apparatus comprising a casing, the backlight unit that is supported by the casing and comprises light emitting diodes (LEDs), and a shield cover that is provided behind the backlight unit, comprising: a cooling fan; and a fan cover that has one side provided with a plurality of first combining parts combined with the cooling fan and the other side provided with a plurality of second combining parts combined with the shield cover.

According to an exemplary embodiment of the present invention, at least one of the first combining parts and the second combining parts is provided with a vibration absorption member that absorbs vibration generated from the cooling fan.

BRIEF DESCRIPTION OF THE DRAWINGS

The above and/or other aspects of the present invention will become apparent and more readily appreciated from the following description of exemplary embodiments, taken in conjunction with the accompanying drawings, in which.

DETAILED DESCRIPTION OF EXEMPLARY EMBODIMENTS OF THE INVENTION

Figure 1:
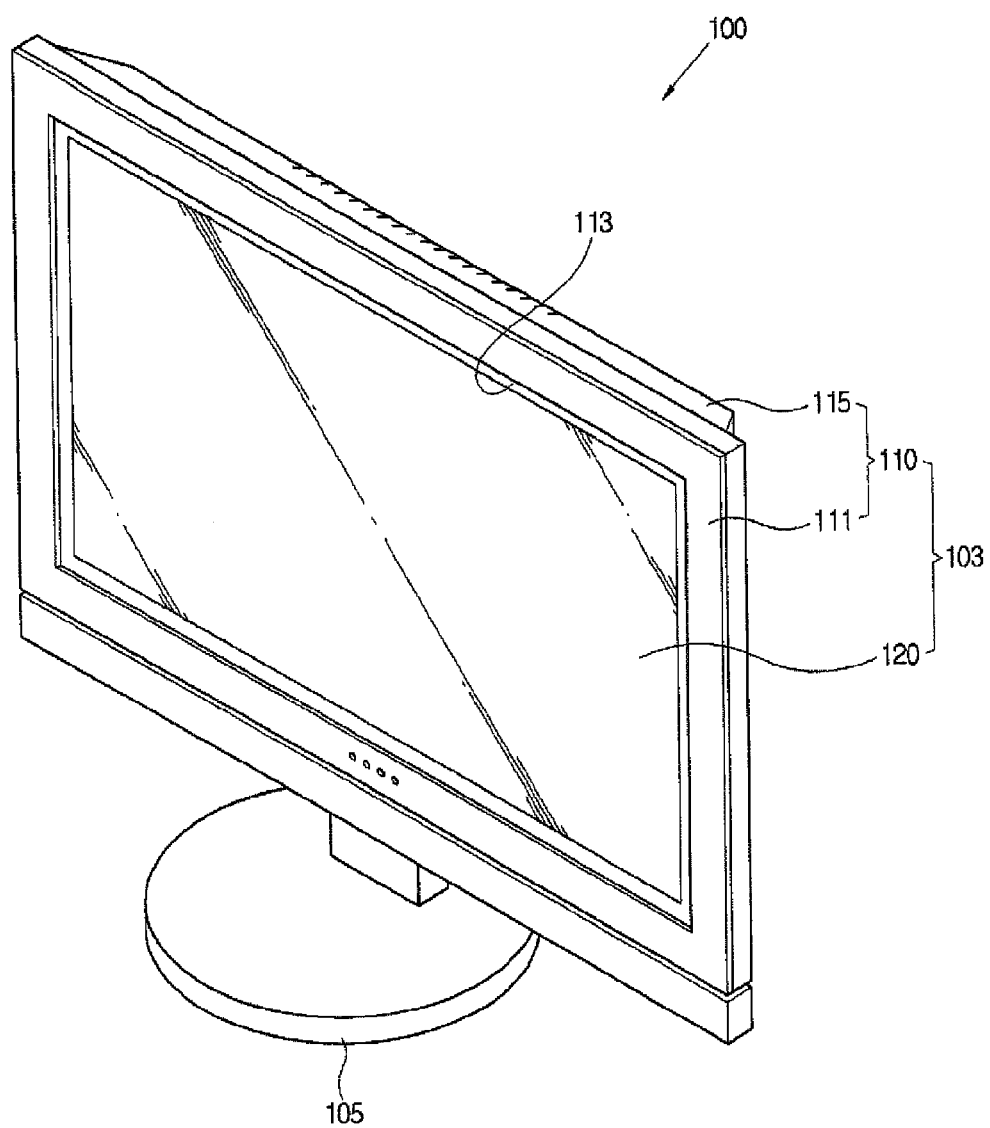
FIG. 1 is a perspective view of a display apparatus according to an exemplary embodiment of the present invention.

Reference will now be made in detail to exemplary embodiments of the present invention, examples of which are illustrated in the accompanying drawings, wherein like reference numerals refer to like elements throughout. The exemplary embodiments are described below so as to explain the present invention by referring to the figures.

Although a display apparatus may generally comprise a TV or a computer monitor, the TV will be explained as one of the exemplary embodiments of the present invention hereinafter.

As shown in FIGS. 1 to 6, a display apparatus 100 according to an exemplary embodiment of the present invention generally comprises a display body 103 and a stand 105 that supports the display body 103. The display body 103 comprises a liquid crystal display panel 120, a backlight unit 130, a shield cover 140, and a cooling fan unit 200. The display body 103 further comprises a controller 260 that controls the backlight unit 130. The display apparatus 100 further comprises a casing 110 that accommodates and supports the liquid crystal display panel 120 and the backlight unit 130 to form an external shape, and comprises a front casing 111 and a rear casing 115.

The front casing 111 comprises an opening part 113 and supports the liquid crystal display panel 120 on which an image is displayed.

The rear casing 115 is provided in the lateral and rear side of the liquid crystal display panel 120 and is combined with the front casing 111. The rear casing 115 is preferably, but not necessarily, combined with the front casing 111 by means of first screws 119. As an alternative, the rear casing 115 may be combined with the front casing 111 by means of combiners known in the art, such as snaps or hooks. The rear casing 115 has a plurality of air slits 117 through which air produced by a cooling fan 210 comes in and out. The rear casing 115 may be made of aluminum having a high heat conductivity.

The liquid crystal display panel 120 forms an image and displays the formed image through the opening part 113. The liquid crystal display panel 120 has a rectangular plate shape. The liquid crystal display panel 120 comprises a liquid crystal driver (not shown) that drives the liquid crystal display panel 120 to form the image, and a power supply 250 supplies power to the liquid crystal driver.

The backlight unit 130 comprises a plurality of light emitting diodes (LEDs) as a light source 131 (see FIG. 5) that generates light. The backlight unit 130 may further comprise a diffusing sheet (not shown) that is provided above the LEDs in order to diffuse light emitted from the LEDs, an optical sheet (not shown), or other known elements in the art. A circuit board 133 that applies or controls power to the light source 131 and so on is combined to the rear side of the backlight unit 130 and is connected to the controller 260. The circuit board 133 may be combined to a casing (not shown) of the backlight unit 130 by means of second screws 135. The light source 131 of the backlight unit 130 is widely arranged on a plane of the backlight unit 130 and generates heat of high temperature when the light source 131 emits light. If internal temperature of the display apparatus 100 exceeds a predetermined temperature due to heat generated from the light source 131 and the circuit board 133, the backlight unit 130 and so on may malfunction. Accordingly, there is a need to dissipate the heat quickly.

The shield cover 140, which is provided in the rear side of the backlight unit 130, is supported by at least one of the backlight unit 130 and the casing 110, with a space formed between the shield cover 140 and the backlight unit 130. The shield cover 140 may be made of a metal material to shield against an electromagnetic wave generated from the backlight unit 130 and the circuit board 133. The shield cover 140 comprises a fan support 141. The shield cover 140 may have a plurality of air slits 117' through which flowing air produced by the cooling fan 210 comes in and out. The shield cover 140 may be formed in diverse shapes such that the flowing air produced by the cooling fan 210 can be efficiently guided.

The fan support 141 supports the cooling fan unit 200. The fan support 141 is spaced from the rear casing 115 and is formed through the shield cover 140 at a position which is adjacent to the backlight unit 130. The fan support 141 may be formed at a central lower portion of the shield cover 140 such that external air flows through the rear casing 115 and the shield cover 140 from a lower side to an upper side of the backlight unit 130. The fan support 141 may be disposed in different positions of the shield cover 140 in consideration of arrangement of the circuit board 133, if necessary.

Accordingly, the cooling fan 210 may be provided adjacent to the light source 131 and the circuit board 133 which are heat generating parts of the backlight unit 130. Thus, the cooling air generated by the cooling fan 210 contacts the light source 131 that is widely arranged on the rear side of the backlight unit 130 while the cooling air flows through a space among the backlight unit 130, the circuit board 133 and the shield cover 140. This allows the widely arranged light source 131 to be cooled efficiently.

Figure 3:
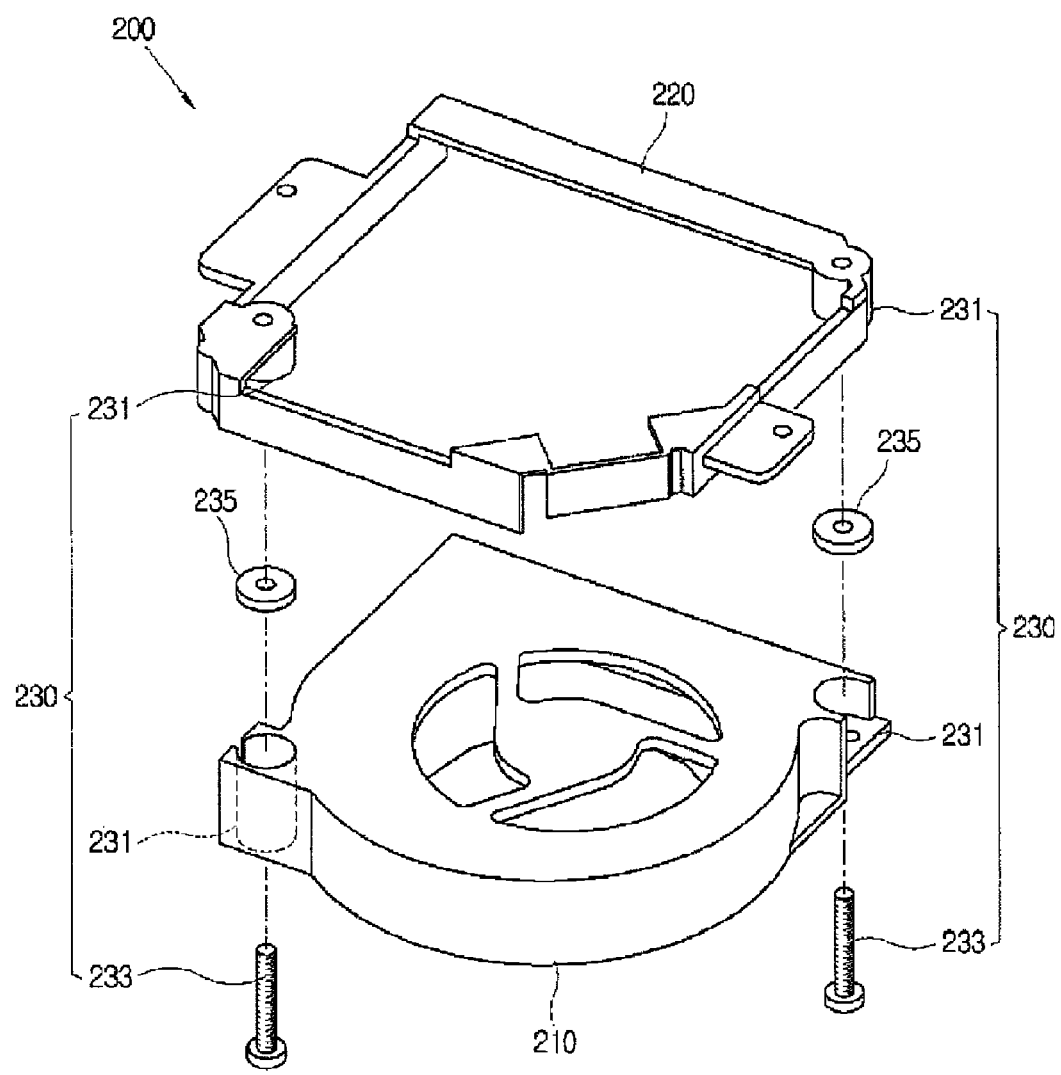
FIG. 3 is an exploded perspective view of a cooling fan unit.
Figure 4:
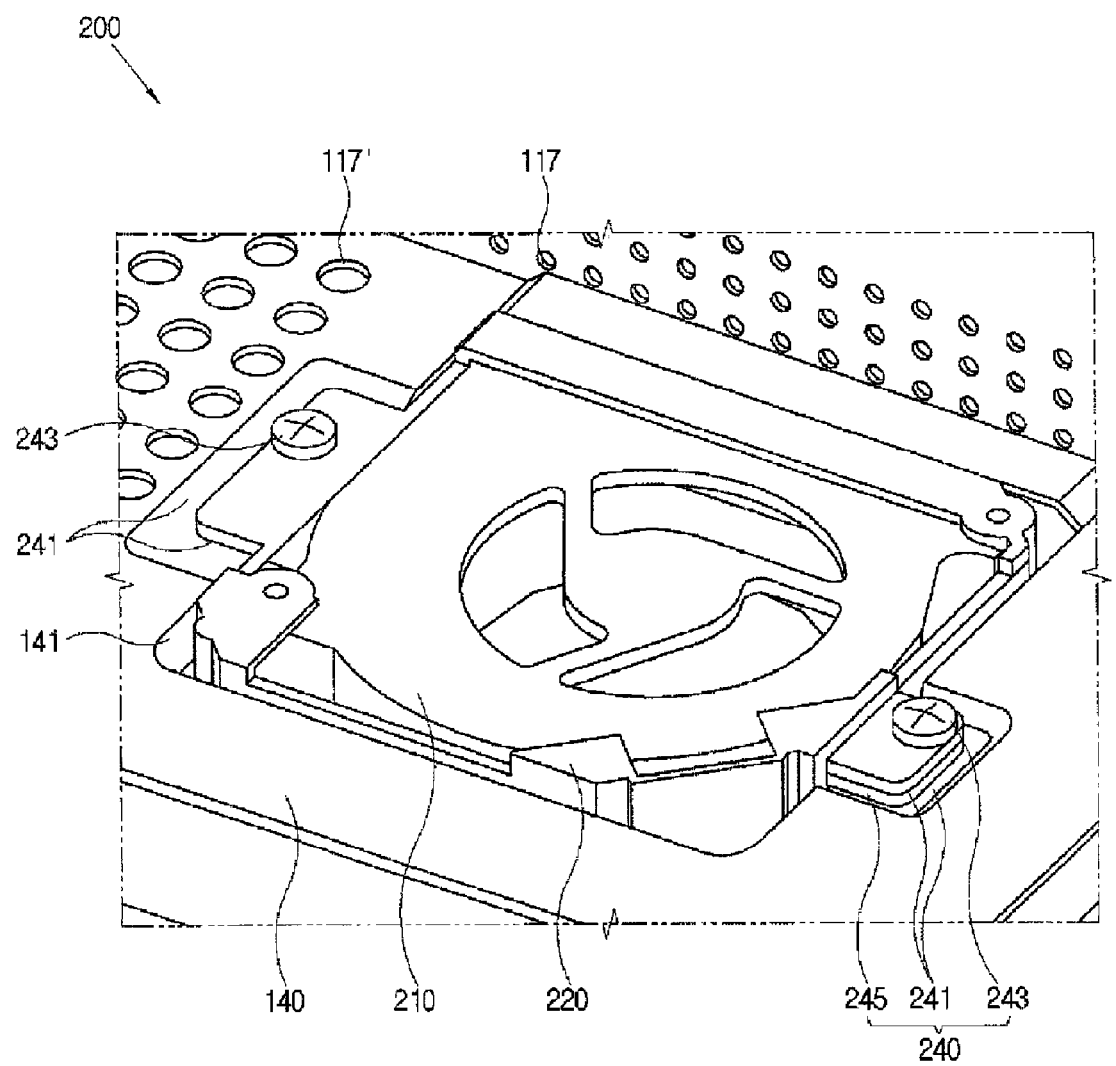
FIG. 4 is a partial perspective view of a mounted cooling fan unit.

The cooling fan unit 200 is combined to the shield cover 140 to cool the heat generating parts such as the light source 131 and the circuit board 133 of the backlight unit 130. As best seen in FIGS. 3 and 4, the cooling fan unit 200 comprises the cooling fan 210 and a fan cover 220. The cooling fan unit 200 further comprises first and second vibration absorption members 235 and 245 that absorb vibration generated by the cooling fan 210.

Figure 2:
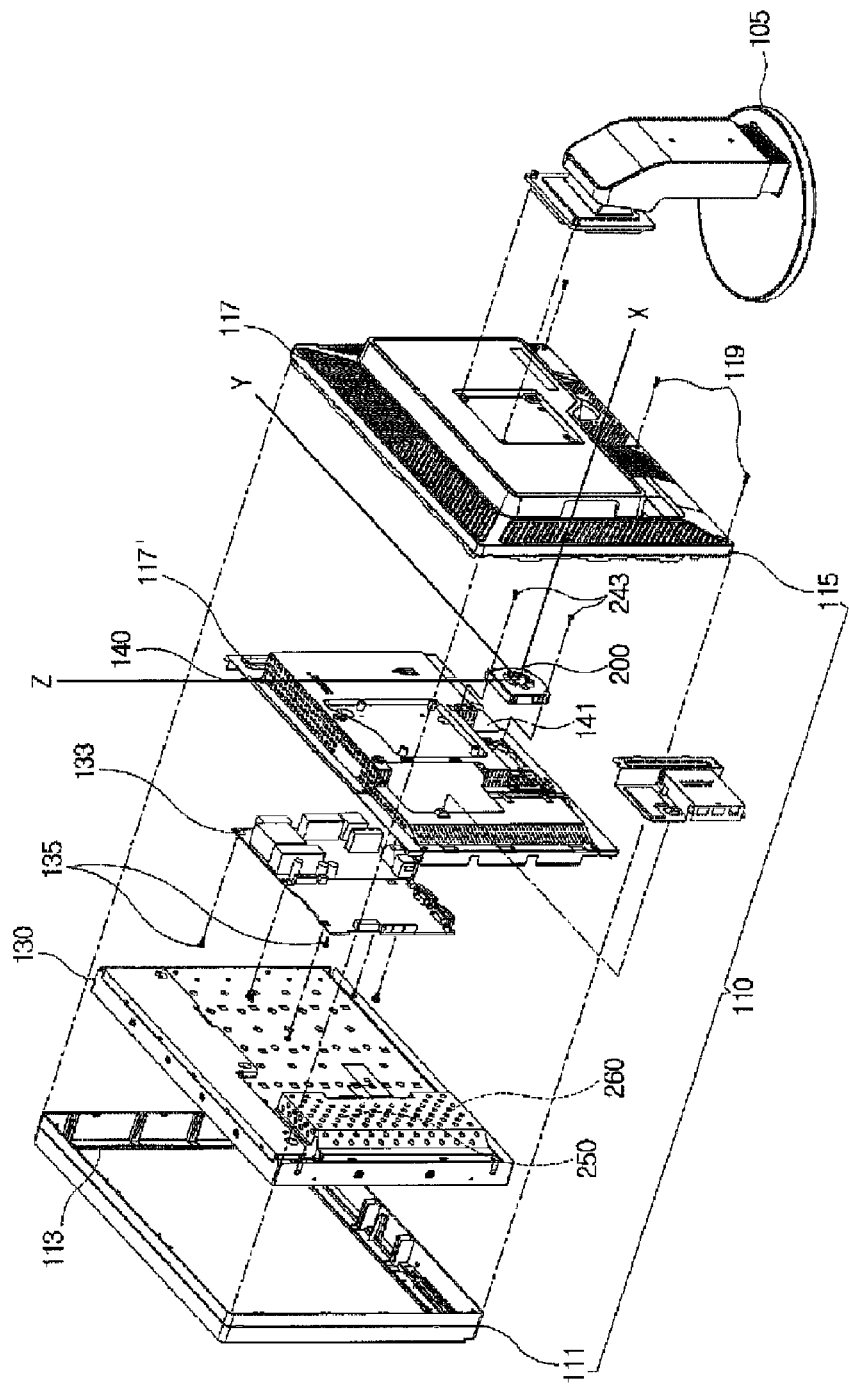
FIG. 2 is an exploded perspective view of the display apparatus of FIG. 1.
Figure 5:
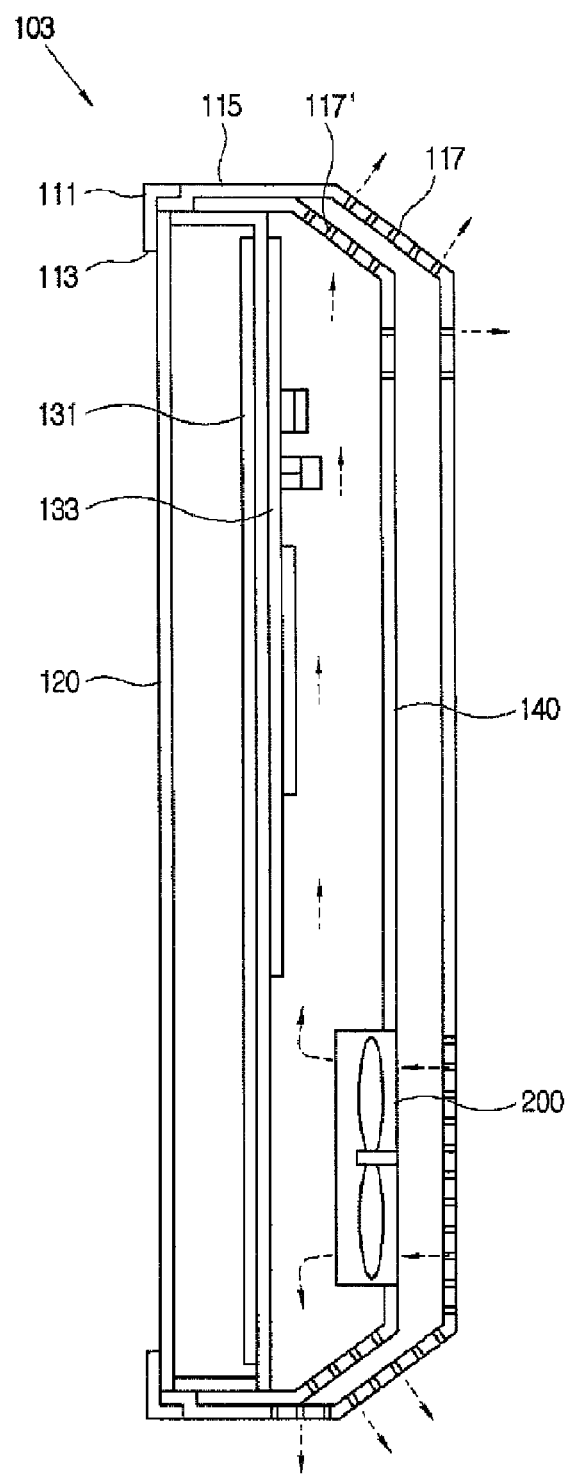
FIG. 5 is a schematic view of a cooling system.

The cooling fan 210 generates cooling air to cool the heat generating parts such as the light source 131 and the circuit board 133 of the backlight unit 130. The cooling fan 210 may be disposed adjacent to the heat generating parts to improve the cooling effect. The operation and rotation speed of the cooling fan 210 is controlled by the controller 260. The cooling fan 210 may be changed to various shapes to improve the cooling effect. In addition, the cooling fan 210 may be provided plural in number in consideration of the size of the backlight unit 130, the capacity of the cooling fan 210, etc. Thus, the cooling air generated by the cooling fan 210 can efficiently cool the LEDs widely distributed on the plane of the backlight unit 130 and the circuit board 133 while the cooling air flows through a space between the shield cover 140 and the backlight unit 130. FIGS. 2 and 5 show the cooling fan unit 200 placed in a lower central portion of the shield cover 140. As an alternative, the cooling fan may be placed in a central portion or an upper portion of the shield cover 140, if necessary. The cooling fan 210 may draw in the cooling air from the outside into the heat generating parts or discharge the cooling air to the outside through the heat generating parts depending on its rotation direction.

The fan cover 220 has one side provided with a first combining part 230 which is combined with the cooling fan 210 and the other side provided with a second combining part 240 which is combined with the shield cover 140. The fan cover 220 is preferably, but not necessarily, made of a plastic material strong enough to support the cooling fan 210, but may be made of diverse materials including a metal material. The fan cover 220 may comprise a guide member (not shown) that guides the cooling air generated by the cooling fan 210 in various directions.

With reference to FIG. 3, the first combining part 230 comprises a first support 231 that supports the cooling fan 210 and the fan cover 220 and a first joining member 233 that joins the cooling fan 210 and the fan cover 220.

The first support 231 may be provided plural in number in order to minimize contact between the cooling fan 210 and the fan cover 220. In addition, the plurality of first supports 231 may be provided at outer sides of the cooling fan 210 and the fan cover 220 in a substantially diagonal direction so that the cooling fan 210 can be stably supported. The first vibration absorption member 235 is disposed between the plurality of first supports 231 to absorb vibration generated between the cooling fan 210 and the fan cover 220.

The first joining member 233 is joined with the first support 231 and joins the cooling fan 210 with the fan cover 220. In this exemplary embodiment, the first joining member 233 comprises a screw. As an alternative, the first joining member 233 may comprise a slidable biting member that combines the cooling fan 210 and the fan cover 220, and a jaw slot which is engaged with the biting member. In addition, for example, one of the first joining members 233 may be provided with a screw and the other thereof may be provided with a biting member and a jaw slot.

The first vibration absorption member 235 is disposed between the first supports 231 and absorbs vibration to be delivered from the cooling fan 210 to the fan cover 220. The first vibration absorption 235 may be provided in a size corresponding to an area contacting the first supports 231. The first vibration absorption member 235 is preferably, but not necessarily, made of a material such as nonwoven fabric, but may selectively be made of various materials including rubber and other known materials in the art.

With reference to FIG. 4, the second combining part 240 comprises a second support 241 that supports the fan cover 220 and the shield cover 140 and a second joining member 243 that joins the fan cover 220 and the shield cover 140.

The second support 241 may be provided in the plural number in order to minimize contact between the fan cover 220 and the shield cover 140. The plurality of second supports 241 may be provided at outer sides of the fan cover 220 in a substantially diagonal direction so that the fan cover 220 can be stably supported. The second vibration absorption member 245 is provided between the plurality of second supports 241 to absorb vibration generated between the fan cover 220 and the shield cover 140.

The second joining member 243 is combined to the second support 241 and joins the fan cover 220 and the shield cover 140. In this exemplary embodiment, the second joining member 243 comprises a screw. As an alternative, the second joining member 243 may comprise a slidable biting member that combines the fan cover 220 and the shield cover 140 and a jaw slot which is engaged with the biting member. In addition, for example, one of the second joining members 243 may be provided with a screw and the other thereof may be provided with a biting member and a jaw slot.

The second vibration absorption member 245 is joined between the second supports 241 and absorbs vibration to be delivered to the fan cover 220 and the shield cover 140. The second vibration absorption member 245 may be provided in a size corresponding to an area contacting the second supports 241. The second vibration absorption member 245 is preferably, but not necessarily, made of a material such as nonwoven fabric, but may be made of diverse materials including rubber and other known materials in the art.

Thus, the fan cover 220 has a minimal joining portion with respect to the cooling fan 210 and the shield cover 140, thereby preventing noise and vibration generated by rotation of the cooling fan 210 from being delivered to the fan cover 220 and the shield cover 140, thus minimizing vibration to be delivered from the cooling fan 210 to other members. In addition, since the first and second vibration absorption members 235 and 245 are provided in the first and second combining parts 230 and 240, vibration generated from the cooling fan 210 can be minimized.

The power supply 250 supplies power to the display main body 103. As shown in FIG. 2, the power supply 250 may be combined to the liquid crystal display panel 120, or may be combined to the shield cover 140, if necessary.

Figure 6:
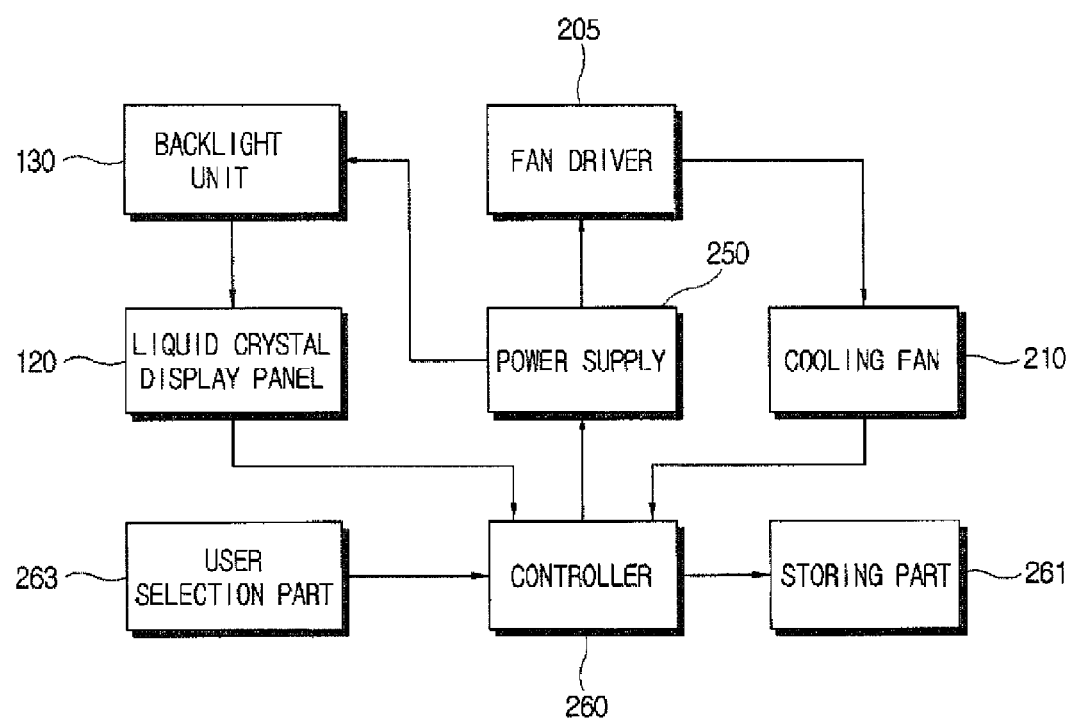
FIG. 6 is a control block diagram of the display apparatus according to an exemplary embodiment of the present invention.

On the other hand, as shown in FIG. 6, the display apparatus 100 according to the exemplary embodiment of the present invention may further comprise the power supply 250, a storing part 261 and a user selection part 263.

The power supply 250 supplies power to the backlight unit 130 so that the LEDs can emit light, and supplies power to a fan driver 205 for operation of the cooling fan 210.

The storing part 261 may store modes corresponding to luminance of an image displayed on the liquid crystal display panel 120. In this exemplary embodiment, it is assumed that the liquid crystal display panel 120 can display an image having the maximum luminance of 250 cd/m².

The user selection part 263 is used to receive a selection instruction to select luminance of the image displayed on the liquid crystal display panel 120 from a user. In addition to the selection instruction, the user selection part 263 may receive various instructions to operate the display apparatus 100, and may be embodied by buttons, a touch screen or the like provided in the liquid crystal display panel 120.

In addition, the user selection part 263 may be embodied by a separate remote controller, a keyboard with a plurality of keypads, a mouse or the like.

Based on the above-mentioned configuration, an operation process of the display apparatus 100 according to the exemplary embodiment will be hereinafter described with reference to FIGS. 5 and 6.

To begin with, an assembly procedure of the cooling fan unit 200 is described.

First, the cooling fan 210 and the fan cover 220 are disposed to correspond to the first support 231 of the cooling fan 210 and the fan cover 220. At this time, the first vibration absorption member 235 is inserted between contact surfaces of the first support 231, if necessary. The cooling fan 210 is assembled with the fan cover 220 by means of the first joining member 233.

Next, the fan cover 220 and the shield cover 140 are disposed so that the second support 241 of the fan cover 220 and the shield cover 140 are mated. At this time, the second vibration absorption member 245 is inserted between contact surfaces of the second support 241, if necessary. The fan cover 220 is combined with the shield cover 140 by means of the second joining member 243. The shield cover 140 assembled with the liquid crystal display panel 120, the backlight unit 130 and the shield cover 140 are combined with the casing 110 to configure the display main body 103. Finally, the stand 105 is combined to the display main body 103 to complete the display apparatus 100.

Next, the completed display apparatus 100 is powered on.

When the backlight unit 130 is supplied with power from the power supply 250, the cooling fan 210 of the cooling fan unit 200 combined with the shield cover 140 begins to rotate under control of the controller 260.

Air drawn in (in a 'X' direction shown in FIG. 2) through the air slits 117 of the rear casing 115 from the outside by the rotation of the cooling fan 210 flows through the heat generating parts such as the light source 131 and the circuit board 133 of the backlight unit 130. The air which flows through the heat generating parts is discharged to the outside (in a 'Y' or 'Z' direction shown in FIG. 2) through the plurality of air slits 117' of the shield cover 140 and the plurality of air slits 117 of the rear casing 115 so that heat generated from the heat generating parts is emitted. The intake and discharge directions of the air through the cooling fan 210 may be changed in various ways according to the arrangement of the heat generating parts, the number of cooling fans 210, etc. With this course, the cooling air evenly contacts the plane of the backlight unit 130 while flowing in a wide area of the backlight unit 130, thereby cooling the light source 131 and the circuit board 133, which are widely arranged in the backlight unit 130. At this time, the fan driver 205 drives the cooling fan 210 at a predetermined rotation speed under control of the controller 260.

The controller 260 receives a taco signal outputted from the cooling fan 250 and detects the rotation speed of the cooling fan 250 based on the taco signal. When the rotation speed of the cooling fan 250 decreases below a reference speed, the controller 260 controls the backlight unit 130 to lower luminance of an image displayed on the liquid crystal display panel 120. For example, when the rotation speed of the cooling fan 250 decreases below 60 Hz, the controller 260 controls the backlight unit 130 to lower luminance of light emitted from the LEDs.

The cooling fan 250 of the display apparatus according to the exemplary embodiment may be provided to have a structure in which external air is discharged to the outside through the cooling fan 250 via the heat generating parts in contrast to the above-described exemplary embodiment.

As apparent from the above description, the present invention provides a cooling fan unit with improved cooling efficiency by efficiently cooling heat generating parts of a backlight unit. In addition, the present invention provides a cooling fan unit which is capable of preventing noise and vibration generated from a cooling fan from being delivered to other parts.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus having a casing in which an opening part is formed, comprising:
   a liquid crystal display panel that is supported by the casing so that an image can be displayed through an opening part;
   a backlight unit that is provided behind the liquid crystal display panel and has a light source that emits light;
   a shield cover that is provided behind the backlight unit and is supported by at least one of the backlight unit and the casing;
   a cooling fan unit that is combined with the shield cover and supplies cooling air to the backlight unit, and
   wherein the cooling fan unit comprises a cooling fan and a fan cover that has one side provided with a first combining part combined with the cooling fan and the other side provided with a second combining part combined with the shield cover.

2. The display apparatus according to claim 1, wherein the light source comprises light emitting diodes (LEDs).

3. The display apparatus according to claim 1, wherein the shield cover is provided with a fan support that supports the cooling fan unit, the fan support being distanced from the casing and being formed at a position adjacent to the backlight unit.

4. The display apparatus according to claim 3, wherein the fan support is formed at a central lower portion of the shield cover.

5. The display apparatus according to claim 1, wherein the casing and the shield cover are provided with a plurality of air slits through which air generated by the cooling fan unit comes in and out.

6. The display apparatus according to claim 1, wherein the first combining part comprises:

a first support that supports the cooling fan and the fan cover; and a first joining member that joins the cooling fan with the fan cover.

7. The display apparatus according to claim 6, wherein the first combining part further comprises a first vibration absorption member that is disposed between a plurality of the first supports and absorbs vibration generated from the cooling fan.

8. The display apparatus according to claim 1, wherein the second combining part comprises:

a second support that supports the fan cover and the shield cover mutually; and a second joining member that joins the fan cover with the shield cover.

9. The display apparatus according to claim 8, wherein the second combining part further comprises a second vibration absorption member that is disposed between a plurality of second supports and absorbs vibration generated from the cooling fan.

10. The display apparatus according to claim 8, wherein each of the first support and the second support is provided plural in number.

11. The display apparatus according to claim 8, wherein each of the first joining member and the second joining member comprises a screw.

\* \* \* \* \*